United States Patent [19]

Hira et al.

[11] Patent Number: 4,954,948
[45] Date of Patent: Sep. 4, 1990

[54] MICROPROCESSOR OPERATING SYSTEM FOR SEQUENTIALLY EXECUTING SUBTASKS

[75] Inventors: Gerald M. Hira, Chicago; Dana M. Sheahen, Deerfield; Pamela L. Wilson, Waukegan; Michael P. Nolan, Elk Grove Villiage, all of Ill.

[73] Assignee: Motorola, Inc., Schaumburg, Ill.

[21] Appl. No.: 246,222

[22] Filed: Sep. 20, 1988

Related U.S. Application Data

[63] Continuation of Ser. No. 947,118, Dec. 29, 1986, abandoned.

[51] Int. Cl.$^5$ ............................................. G06F 9/46
[52] U.S. Cl. .............................. 364/200; 364/431.11; 364/231.6; 364/241.3; 364/271.3
[58] Field of Search ... 364/200 MS File, 900 MS File, 364/431.11

[56] References Cited

U.S. PATENT DOCUMENTS

| | | | |
|---|---|---|---|
| 4,337,513 | 6/1982 | Furuhashi | 364/200 X |
| 4,363,097 | 12/1982 | Amano et al. | 364/900 X |
| 4,482,962 | 11/1984 | Amano et al. | 364/200 X |
| 4,589,093 | 5/1986 | Ippolito . | |
| 4,593,280 | 6/1986 | Grow | 340/825.05 |

OTHER PUBLICATIONS

"Operating System Concepts" James L. Peterson, Abraham Silberschatz, Adison-Wesley Publishing Co., Mass 1983 pp. 91-129.

*Primary Examiner*—Eddie P. Chan
*Attorney, Agent, or Firm*—Robert J. Crawford

[57] ABSTRACT

Disclosed is a microprocessor operating system having a program which includes a plurality of tasks requiring periodic execution by the system, and wherein each task is comprised of a plurality of associated subtasks. The system executes the tasks in a orderly fashion by: (A) providing a time variable which is periodically updated to represent a measurement of time; (B) setting the time variable to a predetermined time period during which a first task may be executed; (C) determining whether or not the predetermined time period has lapsed; (D) executing at least one of the subtasks of the first task if the predetermined time period has not lapsed, and then proceeding to step c; and (e) executing another portion of program if the predetermined time period has lapsed, and then proceeding to step c before executing another subtask associated with the first task. When a task having a higher priority than the first task requires execution, the subtask being executing is completed and the higher priority task is executed. Once the first task is returned to for execution, the next subtask is executed. The procedure continually executes all the subtasks associated with the first task.

12 Claims, 4 Drawing Sheets

MICROPROCESSOR OPERATING SYSTEM FOR SEQUENTIALLY EXECUTING SUBTASKS

This is a continuation of application Ser. No. 947,118, filed 12-29-86, now abandoned.

FIELD OF THE INVENTION

The present invention relates generally to sequential control devices, and, more particularly, to sequential control of tasks within a microprocessor operating system.

DESCRIPTION OF THE PRIOR ART

An increasing number of electronic applications utilize a centrally controlled processing system to schedule a plurality of tasks. Such applications range from a specific microcomputer program attempting to schedule a variety of subroutines via a central microcomputer program to applications involving electromechanical robots attempting to self schedule robotic functions.

Many of these applications encounter situations which require interrupting a scheduled task while it is being performed to handle a nonscheduled task having a higher priority. Typically, such interruptions require identifying the current status of the task to be interrupted, and storing this status information so that the status may be restored before the interrupted task is resumed. In many applications, however, the tasks are so complex that a great deal of information must be stored for the task to be properly resumed. In an operating system application, the information which must be stored generally includes the contents of the microprocessor's internal registers, the contents of the variables which are local to the task being interrupted and the contents of the variables which are stored on the stack. Although the internal register contents do not typically exceed 10 to 15 bytes, the stack and the local variables can easily reach hundreds of bytes. For this reason, interrupting scheduled tasks often creates a burden on memory requirements and a time delay on the processing which is intolerable for the overall scheduling process.

There has been a great deal of effort to alleviate these problems. However, much of this effort has been directed to arrangements wherein the processing effort is decentralized, and to arrangements which permit the processor to perform at much greater speeds.

Those efforts which have decentralized the processor tasks include parallel processing, and, through special designs, automatic handling of designated tasks so as to minimize processor register handling. The problem with both the efforts of parallel processing and specialized designs is the cost. Parallel processing requires multiple microprocessors, and specialized designs are inherently expensive due to the labor and time involved.

Those efforts which concentrate on processor speed have been successful to a point. Unfortunately, microprocessor applications are dynamically increasing in complexity, and the number of required processor tasks is constantly on the increase. Hence, for each increment in processor speed, there is even a greater demand in the number of processor tasks which the processor must perform.

Accordingly, a method to schedule tasks for a microprocessor system is needed which overcomes the above mentioned deficiencies.

OBJECTS AND SUMMARY OF THE PRESENT INVENTION

It is a general object of the present invention to provide a method for controlling the execution of tasks in an operating system which overcomes the above mentioned shortcomings.

It is a further object of the present invention to provide a method for controlling the execution of tasks in a computing system which accommodates high priority tasks while minimizing the number of variables to be stored for execution of the high priority tasks.

It is yet a further object of the present invention to provide a method for controlling the execution of tasks in an computer system which accommodates high priority tasks while minimizing processing time overhead to handle the execution of the high priority tasks.

The invention may briefly be described in terms of a preferred embodiment involving a computing system having a program which includes a plurality of tasks requiring periodic execution by the computing system, and wherein each task is comprised of a plurality of associated subtasks. The computing system executes the tasks in an orderly fashion by implementing the following steps: (a) providing a time variable which is periodically updated to represent a measurement of time; (b) setting the time variable to a predetermined time period during which a first task may be executed; (c) determining whether or not the predetermined time period has lapsed; (d) executing at least one of the subtasks of the first task if the predetermined time period has not lapsed, and then proceeding to step (c); and (d) executing another portion of program if the predetermined time period has lapsed, and then proceeding to step (c) before executing another subtask associated with the first task.

When a task having a higher priority than the first task requires execution, the subtask being executing is completed and then the higher priority task is executed. Once the first task is returned to for execution, the next subtask is executed. The procedure continually executes all the subtasks associated with the first task.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in which like reference numerals identify like elements, and wherein:

FIG. 2b is an expanded flowchart of block 40 in FIG. 2a;

DETAILED DESCRIPTION OF THE PREFERRED EMBODIMENT

Figure 1:
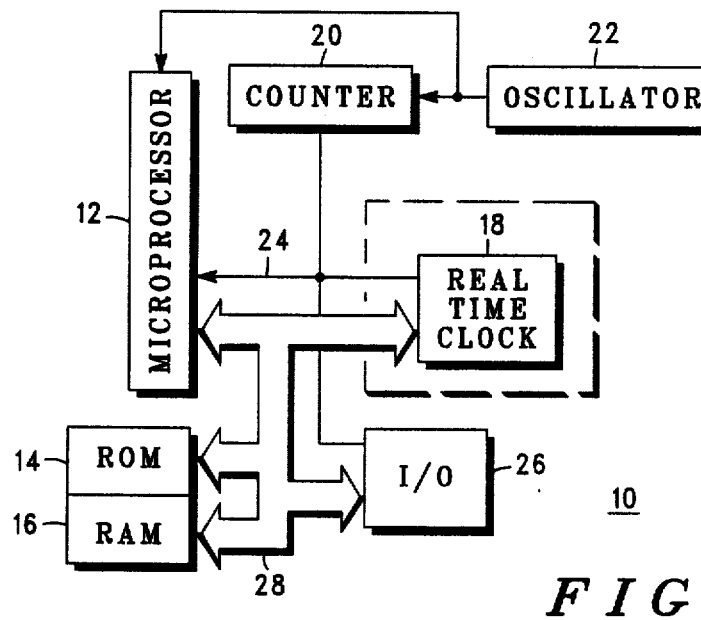
FIG. 1 is a block diagram of a preferred system which may be used for implementing the present invention.

Referring now to FIG. 1, a preferred hardware system 10 is illustrated which may be used for implementing the present invention. The system includes a microprocessor 12, read only memory (ROM) 14 and read-write memory (RAM) 16 configured in the conventional manner. As will be discussed with FIG. 2a, the microprocessor 12 coordinates the execution of a plurality of tasks in a particular and advantageous manner.

Also depicted in the system 10 is a real time clock 18, such as the Motorola MC146818, a digital counter 20 and an (crystal) oscillator 22. The real time clock 18 may be programmed by the microprocessor 12 to provide an interrupt signal 24 to alert the microprocessor 12 of incremental changes in time. However, it is relatively expensive.

Since every processor requires some form of an oscillator to step through its instructions and since counters are much less expensive than real time clocks, the counter 20 is preferred to provide the interrupt signal 24 instead of the real time clock 18. This is conventionally accomplished by counting a fixed number of pulses output from the oscillator and outputting an interrupt signal 24 whenever the fixed number is reached. This timing feature is necessary in the system 10 as will be discussed with FIG. 2a.

Also illustrated in FIG. 1 is an input/output (I/O) device 26. The I/O device 26 may be used for practically any type of data transfer to or from the microprocessor 12 including data pertaining to output display and reception of operator input information. The I/O device 26 is coupled to the interrupt signal 24 to allow the I/O device 26 to request immediate service from the processor 12. The manner in which this occurs is subsequently discussed with FIG. 2a.

The microprocessor 12 employs the interrupt signal 24 to periodically update an internal counter, which may be stored in an internal register or, preferably, stored in RAM 16 as a programmable variable. Conventionally, whenever the interrupt occurs, for example each 100 milliseconds, the microprocessor 12 increments the programmable variable. Alternatively, if the variable is initialized to some integer greater than zero, the variable would be decremented. Since decrementing and incrementing the variable basically serve the same function, the term "decrementing" will be used hereinafter to encompass the general function of incremental changes in time.

Figure 2A:
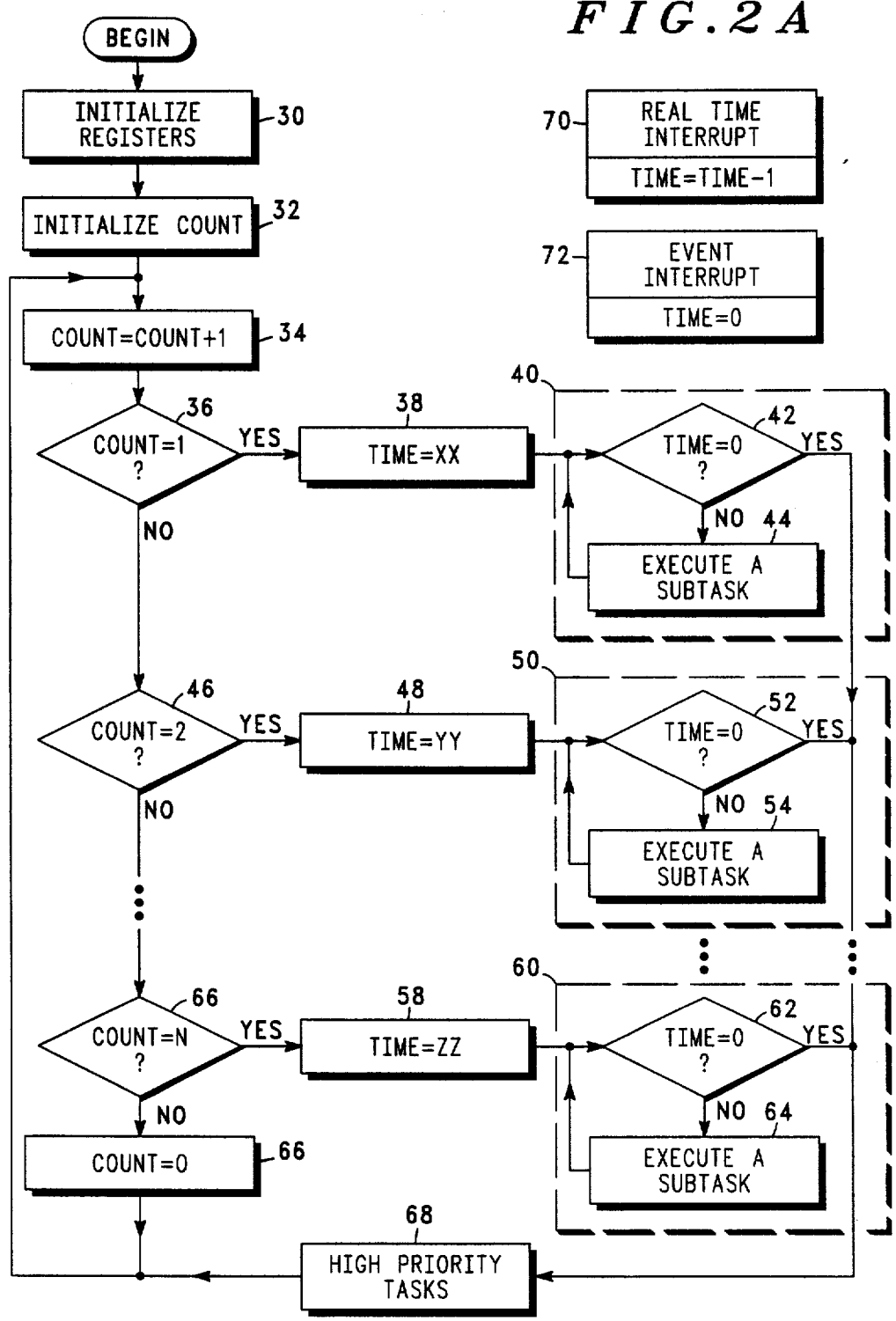
FIG. 2a is a flowchart which describes steps for implementing the present invention for the circuit illustrated in FIG. 1.

In FIG. 2a, the programmable variable discussed above is referred to as "TIME". TIME is used to indicate the time allowed or remaining for execution of one of a plurality of microprocessor controlled tasks.

A second variable is used in the flowchart of FIG. 2a. It is referred to as "COUNT". COUNT is used to determine which of the tasks to execute. If COUNT contains a number associated with a particular task, that particular task will be executed. This will be further exemplified with discussion of the flowchart in FIG. 2a below.

The flowchart begins at block 30 where a general initialization of variables and registers is performed by the microprocessor. At block 32, the microprocessor initializes COUNT to zero.

At block 36, the COUNT variable is incremented by one.

At block 36, a test is performed to determine if COUNT is equal to 1. If COUNT is equal to 1, a first task 40 will be given control of the processor for executing its functions, and flow proceeds to block 38 where TIME is initialized to some positive integer XX, representing the predetermined execution time for the first task, i.e. task No. 1 (40) in the dotted lines. As discussed above, TIME is automatically and periodically decremented by the microprocessor 12 via the interrupt signal 24 (FIG. 1).

If COUNT is not equal to 1, flow proceeds to block 46 where a test is performed to determine if COUNT is equal to 2. If COUNT is equal to 2, the second task 50 will be given control of the microprocessor for executing its functions, and flow proceeds to block 48 where TIME is initialized to some positive integer YY, representing the execution time for task number 2.

If COUNT is not equal to 2, flow proceeds to block 56 where a test is performed to determine if COUNT is equal to N, and the pattern continues until the contents of COUNT matches an appropriate task number for execution of the task. After the last task number has been compared to COUNT, flow proceeds to block 66 where COUNT is reset to zero, from which point flow continues at block 34.

Once it has been determined that COUNT is equal to the task number to which it is being compared, TIME is initialized to some positive integer representing the execution time for the task (as mentioned above), and flow proceeds to the particular task itself.

Each of the tasks is divided into a plurality of subtasks associated with the general task. For example, the general task may include a plurality of individual and independant subtasks or sub-functions. Alternatively, the general task may be comprised of a plurality of dependent functions or segmented steps, each of the segmented steps being referred to as a subtask. However, in the latter case the dependent functions (segmented steps) should not require excessive use of shared variables. This ensures that onlY a minimal number of variables is stored after each function (segment) is executed.

Each of the tasks 40, 50, and 60 are composed of two primary blocks, blocks 42 and 44, blocks 52 and 54, and blocks 62 and 64, respectively. At the first block of each pair, a test is performed to determine whether or not TIME has been decremented to zero. If it has, flow proceeds to block 68 to execute another portion of the microprocessor program. If TIME has not been decremented to zero, it is presumed that there is time for executing an associated subtask. After one subtask is executed, flow returns to the first functional block to determine if there is time enough for executing another subtask; i.e., to determine if TIME has timed out.

For example, if COUNT is equal to 1, from block 36, flow proceeds to block 38 where TIME is initialized for the first task 40. In this example, let TIME be initially set to 50 msec. At block 42, TIME is compared to zero. At first TIME is not equal to zero so flow proceeds to block 44 and one associated subtask is executed. Presuming that this first subtask requires 30 msec. of execution time, when flow returns to block 42, TIME will be equal to 20 msec. At block 42, since TIME is not equal to zero, flow returns to block 44 to execute the next associated subtask. If this second associated subtask requires 28 msec. of execution time, then when flow returns to block 42 TIME will have lapsed and flow will exit the first task 40. At the blocks depicting the second task 50 through the Nth task 60, the procedure is the same.

When flow exits a particular task, due to TIME having lapsed, flow proceeds to block 68 where high priority tasks (if any) are executed. High priority tasks are tasks that cannot be scheduled in the same flow as the first through the Nth tasks because they require execution much more frequently. This follows since, as the flow in FIG. 2a illustrates, where the first through the Nth tasks are executed once every 2N times, the high priority tasks at block 68 are executed every other time.

After completing the high priority tasks at block 68, flow returns to block 34 where COUNT is incremented to indicate the next task to be executed.

Blocks 70 and 72 depict two additional functions that may occur during normal execution. Both functions occur as a result of an interrupt; hence, either function may occur at practically any time. At block 70, the real time interrupt is depicted. This interrupt is a function of either the real time clock 18 or the counter 20, from FIG. 1, depending on which is being used. When the real time interrupt occurs, the processor 12 (FIG. 1) decrements TIME in the conventional manner discussed previously.

At block 72, an event interrupt is depicted. The event interrupt may occur when an unexpected or unscheduled event occurs. For example, the I/O device 26 in FIG. 1 may require immediate attention due to I/O errors suspected at one of its ports. Hence, via a request by the I/O device 26, the processor may set TIME equal to zero. This will force an exit from any non-high priority task currently being executed immediately following completed execution of an associated subtask.

Figure 2B:
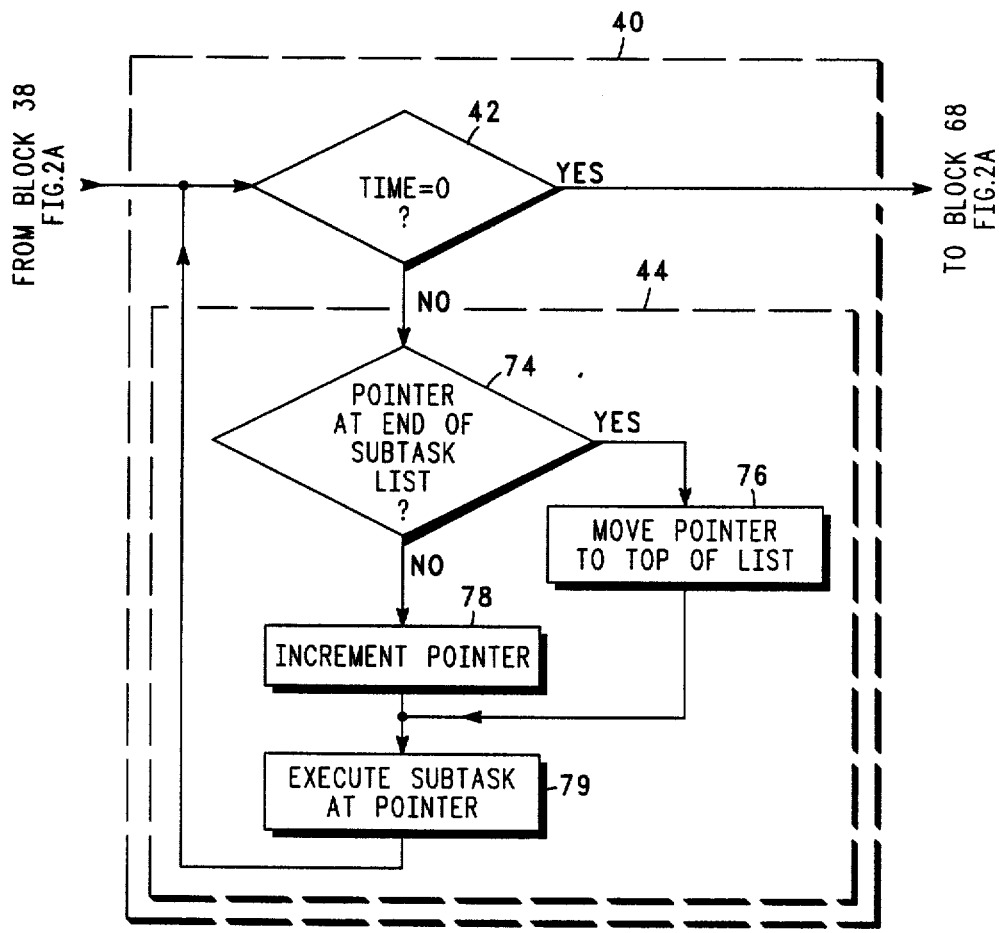

In FIG. 2b, an expansion of block 40 (virtually identical to blocks 50 and 60) is shown. More particularly, block 44 is expanded to illustrate how the subtasks are tracked. Each subtask has a beginning address in the program, which is stored in a list. A pointer is used to step through the list one subtask at a time. When one of the subtasks has been executed, the pointer is moved up to point to the beginning address of the next subtask. After all the subtasks have been executed, the pointer is moved to the beginning address in the list. This is further described in the discussion that follows.

If, after the test at block 42, TIME is not equal to zero, a test is performed to determine if the subtask pointer (PNTR) is at the end of the subtask list, depicted at block 74. If the subtask pointer is at the end of the list, it is moved to the top of the list at block 76. Otherwise, at block 78, the subtask pointer is incremented once to indicate the next subtask to be executed.

After execution of either block 76 or 78, the subtask currently pointed at is executed. This is depicted at block 79. Flow then resumes at block 42 as previously discussed.

Accordingly, by dividing the various functions of each of the tasks into a plurality of independent subtasks, and periodically checking the TIME variable for the time remaining to execute the task, regularly scheduled tasks and high priority tasks may be executed without interrupting the tasks with the typical enormous overhead of variable storage. Moreover, nonscheduled events are accomodated through the use of the above described interruption mechanism.

Figure 3:
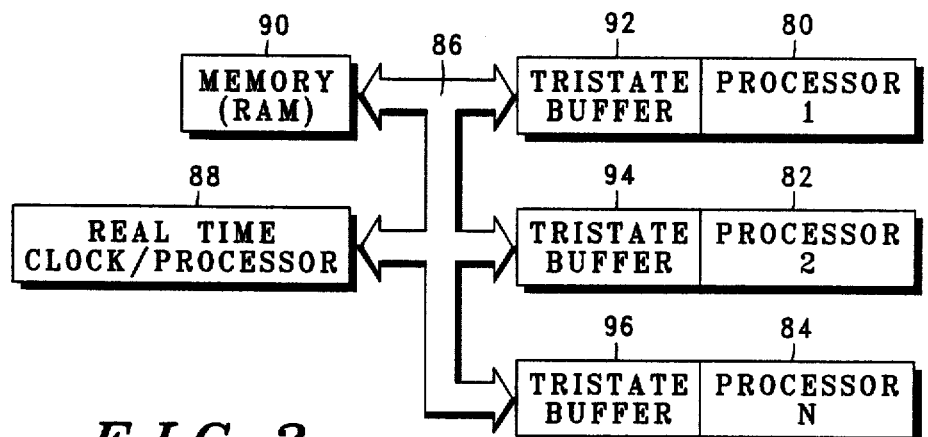
FIG. 3 is an arrangement, in the form of a block diagram, which illustrates an alternative system in which the present invention may be implemented.

Referring now to FIG. 3, an alternate embodiment for applying the present invention is illustrated. Three processors 80, 82 and 84 are shown connected by a common data bus 86, similar to the bus described in FIG. 1. Also connected to the bus 86 is a combination real time clock and processor (RTC/PROC) 88 and a memory device (RAM) 90. (The system 10, described in FIG. 1, may be used to implement the RTC/PROC 88.) Each of the processors 80, 82 and 84 are configured to execute a particular task which requires access to the memory device (RAM) 90. Each of the processors 80, 82 and 84 also has access to a "TIME" variable, located within the RTC/PROC 88, to determine if it has time to execute an associated subtask. ("COUNT", "TIME" and "subtask" carry the same meaning as was described previously). The TIME variable and the RAM 90 are only accessible after the RTC/PROC 88 has delegated control of the bus 86 to one of the processors 80, 82 or 84. This is accomplished by utilizing the COUNT variable in a manner similar to what has been described above.

Coupled between each processor 80, 82 and 84 and the bus 86 is respective tristate circuitry, 92, 94 and 96, such as JEDIC 741s240's, conventionally arranged to prohibit bus contention. The individual processors self-enable their respective tri-state circuits to transmit onto the bus 86 only after the RTC/PROC 88 has delegated the bus 86 to that processor.

Each processor 80, 82 and 84 is programmed to handle its respective task in the said manner as was described in FIG. 2a, i.e., each task is divided into subtasks which are executed one subtask at a time.

Figure 4A:
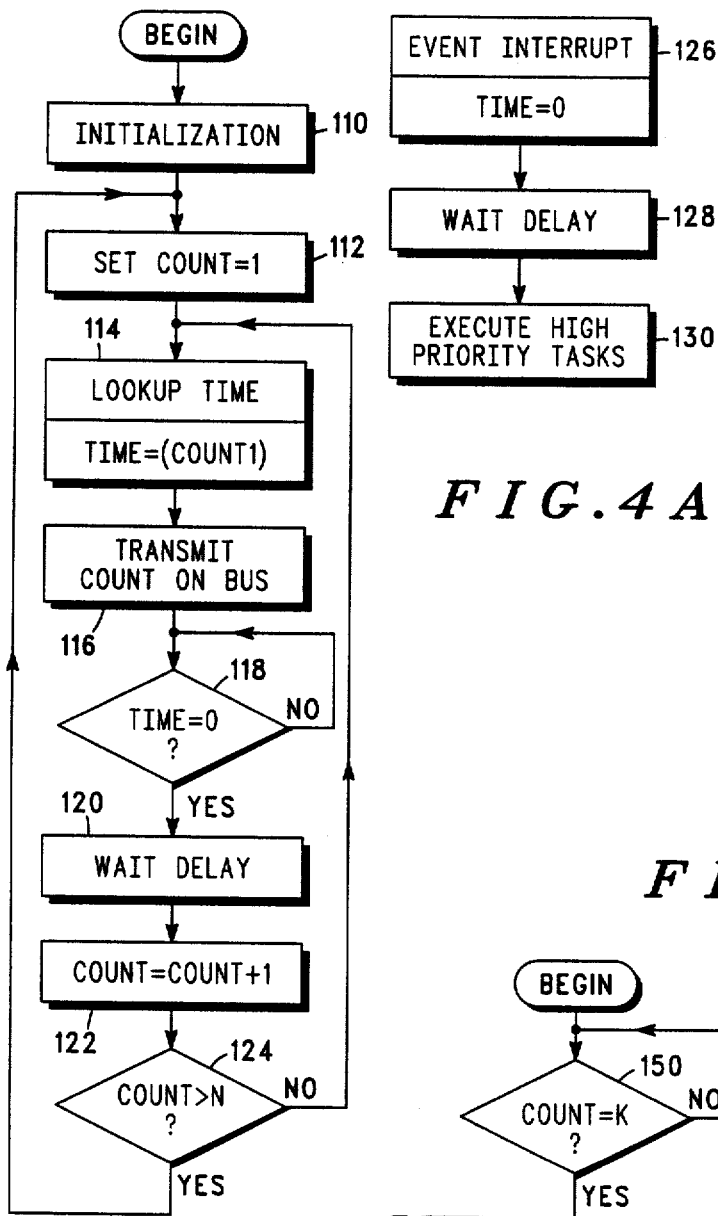
FIG. 4a is a flowchart which describes steps for implementing a first portion of the system in FIG. 3.

In FIG. 4a, a procedure is provided for the RTC/PROC 88 to control the system in FIG. 3. Due to the hardware differences, the procedure for FIG. 3 differs from that shown in FIGS. 2a and 2b, but similarities will be obvious.

The procedure begins at block 110, where a general initialization is performed on internal registers and miscellaneous variables.

At block 112, the COUNT variable is initialized to 1 to indicate that the first processor 80 will be given access to the RAM 90 and the TIME variable.

At block 114, a look-up table, located in memory local to the RTC/PROC 88 (eg. RAM 16 in FIG. 1), is provided to initialize TIME to a positive integer for the particular processor designated by COUNT, similar to the assignment from FIG. 2a.

At block 116, the RTC/PROC 88 transmits the contents of COUNT onto the bus 86. The processors 80, 82 and 84 are all programmed such that, except when they have control of the bus 86, they are monitoring the bus for the COUNT transmission. Although there may be a variety of ways to monitor the bus, it is preferred that each processor periodically reads the bus 86, while executing instructions that do not require the bus 86, to determine if the COUNT variable is present. COUNT may be distinguished from other data transmitted on the bus 86 by using the conventional approach of preceding it with a special character string.

At block 118, the RTC/PROC 88 waits for the TIME variable to decrement to zero. The TIME variable is decremented through the RTC portion of the RTC/PROC 88. Other RTC/PROC tasks may be executed during this wait interval.

At block 120, the RTC/PROC 88 waits for a predetermined period of time to ensure that any subtask being executed will complete before the RTC/PROC assumes control of the bus. The period is determined such that it is at least one time unit greater than the longest amount of time permitted for execution of a subtask. This period is selected since the timer may be a single unit from being timed out, at which point a subtask may begin execution.

At block 122, the COUNT variable is incremented as in FIG. 2a to inform the next processor (task) to assume control over the bus 86.

At block 124, a test is performed to determine if the COUNT variable has been transmitted for all the processors. If so, flow returns to block 112 where COUNT is set back to 1. Otherwise, flow returns to block 114.

Also illustrated in FIG. 4a are blocks 126, 128 and 130. Block 126 indicates that an event interrupt has occurred, similar to block 72 in FIG. 2. Also at block 126 the TIME variable is set equal to zero. At block 128 a wait procedure begins for the same time period, for the same reason as discussed above for block 120. Once the wait procedure ends, flow proceeds to block 130 where the RTC/PROC 88 is given control of the bus 86 for executing high priority tasks. Once the high priority tasks are completed, the RTC/PROC 88 relinquishes control of the bus 86 to the processor in previous control.

Figure 4B:
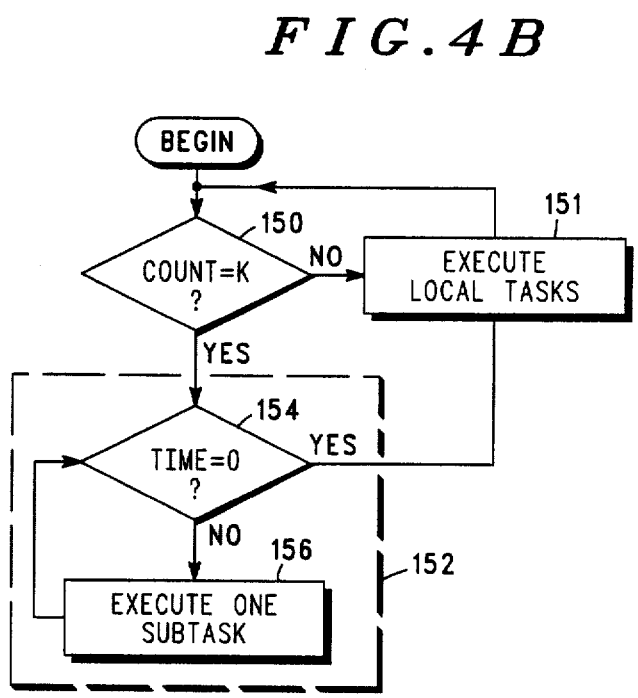
FIG. 4b is a flowchart which describes steps for implementing a second portion of the system in FIG. 3.

In FIG. 4b, a procedure is provided for each of the processors 80, 82 and 84 of FIG. 3. Since each of the processors 80, 82 and 84 utilize the procedure in the same manner, the following discussion will refer to an arbitrary processor K, which may be any one of these processors.

The procedure begins at block 150 where the COUNT variable is read from the bus 86 to determine if the RTC/PROC 88 has assigned the bus to processor K. If it has not, flow proceeds to block 151 where processor K executes tasks which are local to its architecture, i.e., where access to the bus 86 is not necessary. It should be noted that execution of local tasks periodically terminates so that the test performed in block 150 can be repeated. This allows processor K to track its opportunities to control bus 86 as it becomes necessary.

If COUNT is equal to K, flow proceeds to block 152 where control of the bus 86 becomes available.

At block 154, processor K reads the TIME variable in the RTC/PROC 88 to determine if there is time to begin a subtask. If TIME is equal to zero, flow returns to block 151 where local tasks are executed and COUNT is monitored.

If TIME is greater than zero, one subtask is executed at block 156 before flow returns to block 154. The operation in block 152 is very similar to that performed at blocks 40, 50 and 60 in FIGS. 2a and 2b.

Accordingly, FIG. 3 illustrates an alternative computing system to that shown in FIG. 1, one which utilizes multiple processors executing each of the tasks rather than only one. In both systems, the tasks (each associated with a software or hardware module) are divided into subtasks and handled using the same overall principles as is illustrated in FIGS. 2a, 4a and 4b. Regardless of the number of processors required for executing the tasks, each module is responsible for controlling the TIME variable in response to the COUNT variable being assigned to its particular module.

It is noted that a benefit of the configuration in FIG. 3 is that it provides a method for sharing a common memory by the several processors. The memory sharing method has the advantage of efficient memory access with minimal overhead and data manipulation each time a processor interrupts its program to access the common memory.

In a specific application of the present invention, the system 10 in FIG. 1 is employed as a vehicle monitoring system for the purpose of logging vehicle information while the vehicle is on the road. The system 10 utilizes the program structure, as illustrated in the flowchart of FIG. 2a, to control a number of tasks, some of which are high priority tasks, to track related activities of the vehicle. Three of the tasks which are not high priority are: diagnostics; vehicle travel data; and off board (external) communications.

The diagnostics task includes monitoring vehicle devices or items such as fluid temperature and level sensors, integrity of electrical circuitry and the pressure of tires. The diagnostic task may be associated with block 40 in FIG. 2a, while each subtask in block 40 is associated with each one of the devices or items mentioned above.

The vehicle travel data task includes maintenance of vehicle trip parameters such as trip time, mileage, petroleum usage and efficiency. The vehicle travel data task may be associated with block 50, while each subtask in block 50 is associated with each one of the trip parameters mentioned above.

The off board communications task includes transferring data between the monitoring system and an external computer on a computer port or communication path and is employed to handle programming and communicating such parameters as wheel size, truck weight, etc. The off board communications task may be associated with block 60 while each subtask in block 60 may be associated with each one of the communication ports mentioned above.

The high priority task, as depicted in block 68 of FIG. 2a, includes quick and efficient updating of system alarm/alert conditions including information pertaining to communication with an electronic transmission controller, operator interface information (horn, lights, diagnostic messages, etc.), and the capability to shut down the software in case of fault.

As discussed previously, if a task requires interruption, the TIME variable may be reset before another associated subtask is executed and the device or high priority task requesting the interruption may be executed. For example, if the off board communication task was being executed and the software needed to be shut down because of a sudden fault, the TIME variable would be reset and once the subtask within the off board communication task is completed, the off board communication task would be exited and the high priority task requesting the interruption could be executed.

Accordingly, in a vehicle monitoring system application, certain tasks may be executed on a sequential basis, while those high priority tasks discussed above may be executed every other time, or via an interruption request, without excessive delays in information update or control. Further, since the present invention avoids excessive storage of variables after each subtask is completed, substantial allocation of memory is saved.

While the invention has been particularly shown and described with reference to a preferred embodiment, it will be understood by those skilled in the art that various other modifications and changes may be made to the present invention described above without departing from the spirit and scope thereof.

What is claimed is:

1. In a computing system having a program which includes N tasks, where N is two or more, each requiring periodic execution by the computer system, wherein each of the N tasks is comprised of a plurality of associated subtasks, a method for executing the tasks in an orderly fashion, comprising the steps of:

(a) subdividing each of the n tasks into a plurality of associated subtasks and providing a time variable which is periodically updated to represent a measurement of time and providing respective predetermined time periods for the n tasks during which periods the respective tasks are designated to be executed;

(b) setting the time variable to the predetermined time period for a first selected task;

(c) examining the time variable to determine whether or not the predetermined time period associated with the selected task has lapsed;

(d) if the predetermined time period has not lapsed, executing at least one of the subtasks associated with the selected task and then proceeding to step c; and (e) if the predetermined time period has lapsed, executing a portion of the program other than that which is part of the N tasks, wherein said portion of program has a higher priority than each of the n tasks and then setting the time variable to the predetermined time period for another selected task;

(f) repeating steps c through e once for each of the N-1 remaining tasks; and (g) thereafter, repeating steps b through f, thereby continually executing subtasks associated with each of the n tasks.

2. A method for executing the tasks, according to claim 1, including using a single processor to execute steps a through g.

3. A method for executing the tasks, according to claim 1, including using a plurality of processors to execute steps a through g, wherein each of the N tasks is executed by a different processor.

4. A method for executing the tasks, according to claim 3, including using an electrical bus to intercouple the plurality of processors and to provide access to said time variable by each of the processors.

5. A method for executing the tasks, according to claim 1, wherein step d further includes the step of recording that the subtask has been executed.

6. A method for executing the tasks, according to claim 1, including providing an interrupt mechanism to set the time variable to a lesser time period.

7. A method for executing the tasks, according to claim 1, including using the computing system for executing vehicle activity tasks including system diagnostics, vehicle travel data and external communications.

8. A method for executing the tasks, according to claim 7, including subdividing the system diagnostics task into associated subtasks.

9. A method for executing the tasks, according to claim 7, including subdividing the vehicle travel data task into associated subtasks wherein each subtask pertains to maintenance of data for a particular vehicle trip parameter.

10. In a computing system having a program which includes a plurality of tasks requiring periodic execution by the computing system, wherein each task is comprised of a plurality of associated subtasks and wherein the computing system receives an interrupt signal from a peripheral device, a method for executing at least one of the tasks in an orderly fashion, comprising the steps of:

(a) subdividing each of the tasks into a plurality of associated subtasks and providing a time variable which is periodically updated to represent a measurement of time;

(b) providing a predetermined time period during which a selected one of the tasks may be executed;

(d) determining whether or not the time variable has been updated to indicate that the predetermined time period has lapsed;

(d) if the predetermined time period has not lapsed, executing at least one of the subtasks associated with the selected one of the tasks and, in response to the interrupt signal, setting the time variable to a lesser time period to curtail execution of the selected task, and then proceeding to step c; and (e) if the predetermined time period has lapsed, executing a portion of the program other than that which is part of the subtasks and then setting the time variable to the predetermined time period and proceeding to step c before executing another subtask associated with the selected one of the tasks.

11. In a vehicle monitoring system having at least four programmed tasks, three of which include periodically executing: system diagnostics, vehicle travel data, and external communications, a method for executing the tasks, comprising the steps of:

(a) subdividing the system diagnostics task into subtasks, wherein each subtask pertains to a monitored vehicle device;

(b) subdividing the vehicle travel data task into subtasks, wherein each subtask pertains to maintenance of data for a particular vehicle trip parameter;

(c) subdividing the external communications tasks into subtasks, wherein each subtask pertains to a particular communications path;

(d) providing a time variable which is periodically updated to represent a measurement of time and providing respective predetermined time periods for the respective tasks during which periods the respective tasks are designated to be executed;

(e) setting the time variable to the predetermined time period for a first selected one of said three tasks;

(f) examining the time variable to determine whether or not the predetermined time period associated with the selected one of the tasks has lapsed;

(g) executing at least one of the subtasks associated with the selected one of said three tasks if the predetermined time period has not lapsed, and then proceeding to step f;

(h) executing the fourth task if the predetermined time period has lapsed;

(i) setting the time variable to an associated predetermined time period for another of the said three tasks;

(j) repeating steps f through i for the second selected one and then for the third selected one of the tasks; and (k) repeating the steps e through j to continually execute subtasks associated with each of the three tasks.

12. A method for executing the tasks, according to claim 11, wherein said fourth task is a high priority task.

* * * * *

UNITED STATES PATENT AND TRADEMARK OFFICE
CERTIFICATE OF CORRECTION

PATENT NO. : 4,954,948
DATED : September 4, 1990
INVENTOR(S) : Hirka et al.

It is certified that error appears in the above-identified patent and that said Letters Patent is hereby corrected as shown below:

Col. 9, line 1, "n" should be --N--.

Col. 9, line 5, "n" should be --N--.

Col. 9, line 27, "n" should be --N--.

Col. 10, line 7, "(d)" should be --(c)--.

In the Abstract, line 13, "(e)" should be --(E)--.

Signed and Sealed this

Eleventh Day of August, 1992

Attest:

DOUGLAS B. COMER

*Attesting Officer*    *Acting Commissioner of Patents and Trademarks*